FIG. I

Robert A. Benedict
Henry F. Cooper Jr.
George E. Fink,
INVENTORS.

Sept. 17, 1968  R. A. BENEDICT ET AL  3,402,296
ATMOSPHERIC INFRARED RADIATION SCANNER
Filed Jan. 13, 1967  2 Sheets-Sheet 2

Robert A. Benedict
Henry F. Cooper Jr.
George E. Fink,
  INVENTORS.

3,402,296
ATMOSPHERIC INFRARED RADIATION SCANNER
Robert A. Benedict, Ridgefield, Conn., Henry F. Cooper, Jr., Albuquerque, N. Mex., and George E. Fink, Chula Vista, Calif., assignors, by direct and mesne assignments, to the United States of America as represented by the Secretary of the Army
Filed Jan. 13, 1967, Ser. No. 609,727
7 Claims. (Cl. 250—83.3)

ABSTRACT OF THE DISCLOSURE

A device for systematic scanning of the atmospheric background hemisphere with an infrared detector system. A scanner tube is mounted on a rotatable table so that as the table rotates, the scanner tube rotates about its longitudinal axis at the same speed as the table, but in the opposite direction. There is no relative motion between the scanner tube and the structure which supports the rotatable table. Since there is no relative motion, it is possible to have direct electrical connections between the support structure and the scanner tube.

---

The present invention relates generally to infrared radiation scanners and specifically to a device for systematic scanning of the atmospheric background hemisphere with an infrared detection system, thereby providing Wiener spectrum data in the near infrared.

Studies are being performed to determine the characteristics of the earth's atmosphere as an optical medium affecting radiation in the near infrared spectrum. Generally, these characteristics fall into two broad categories; (1) the atmosphere as a transmitter of infrared radiation, and (2) the atmosphere as a source of infrared radiation. This dual nature is due to the physical and chemical composition of the atmospheric fluid, as well as its motions.

As a general definition, the atmosphere may be thought to be that volume of space in which the infrared source and the system detecting that source is immersed, including the intervening space. Care has been taken here in choosing the word "space" rather than "fluid" because the composition of that space may not be uniform throughout; in fact, it may be entirely void of matter. Usually, though, this space contains a nonhomogeneous mixture of gases of varying density, temperature and pressure, interspersed with liquid droplets and solid particles, all in continuous motion. Since the atmosphere is fairly transparent to electromagnetic radiation at visible and infrared wavelengths, it is, therefore, an optical medium which will affect the passage of that radiation. In this regard, the studies dealing with the transmissive nature of the atmosphere consider chiefly the physical phenomena of diffraction, refraction, absorption, as well as the occurrence of scattering.

It may be expected, then, that radiation passing through sufficiently long atmospheric paths will have suffered some deviation and attenuation before entering the detection system. Attenuation is due to the absorption of energy both by the gaseous constituents, and the liquid and solid fraction considered to be carried in suspension. In addition, the deviation from straight-line paths by refraction and scattering accounts for further losses of intensity and energy.

Of decided interest is the phenomenon of atmospheric irradiance—that is, the atmosphere acting as a radiation source. The total irradiance has two major components—self-emission and scattering. Essentially, self-emission results when molecules of the gaseous constituents are bombarded or excited by high-energy radiation, as from solar and cosmic radiation. These molecules then reradiate energy at optical or near-optical wavelengths, yielding the illumination known as "air-glow." The other component of irradiance is due to Rayleigh scattering and Mie scattering. Rayleigh scattering is concerned with scattering of light at high altitudes, primarily, by molecules or particles much smaller than the wavelength of the incident light. Mie scattering, on the other hand, takes place at low altitudes where large water droplets in fog and haze, and dust particles, act as scattering centers. In either case, the scattered light may originate from sources within or exterior to the atmosphere. Once scattered by the atmosphere, this radiation may be "lumped" with the self-emitted radiation, and the combined radiation is termed "background." Particularly, background is the field of view against which a target is viewed.

Background radiation may be studied, independent of its origin and of any perturbational optical phenomena, as an observable property of the atmosphere. It might logically be asked if weather and cloud conditions will have direct influence on such a study. Indeed, clouds, haze and other degrees of aerial moisture and dust content are all elements which either cause or affect background radiation. Obviously, then, background is a transitory phenomenon requiring either constant surveillance or a sampling of a large variety of conditions.

To simplify the notion of background radiation and its study, the apparent background may be projected onto an imaginary hemispherical dome, in the same way as the heavens are viewed on the celestial sphere of the night sky. This forms an extended field composed of a large set of infinitesimal radiators apparently at an infinite distance. As a further generalization, consider that each point source varies its temperature, and consequently its spectral intensity, as some random function of time independent of all the other sources. If some suitable detection system is permitted to scan this irradiant hemisphere in a systematic manner, it is possible to quantitatively record the space-time-intensity distribution of the background referred to as the "Wiener spectrum." The choice of radiation detector and spectral bandpass filter permits selectivity of the center-wavelength and passband of operation.

It is, therefore, an object of this invention to provide an infrared scanner which accomplishes the systematic scanning of the atmospheric background hemisphere, thereby providing Wiener spectrum data in the near infrared.

It is a further object of this invention to provide an infrared scanner wihch examines separately a predetermined annulus of the hemisphere.

It is another object of this invention to provide a scanning device in which the scanning rate may be varied in order to determine field intensities in the annulus scanned.

These and other objects may be attained by providing an infrared detector having an electrical output confined to a predetermined field of view by a directional optics system and made to rotate about a vertical axis to examine an annulus of the hemisphere. The output of the detector which is indicative of the radiation intensity is displayed or recorded by means of electrical circuitry.

The invention, however, will be more fully understood and realized from the following detailed description, when taken in conjunction with the accompanying drawings wherein.

Figure 1:
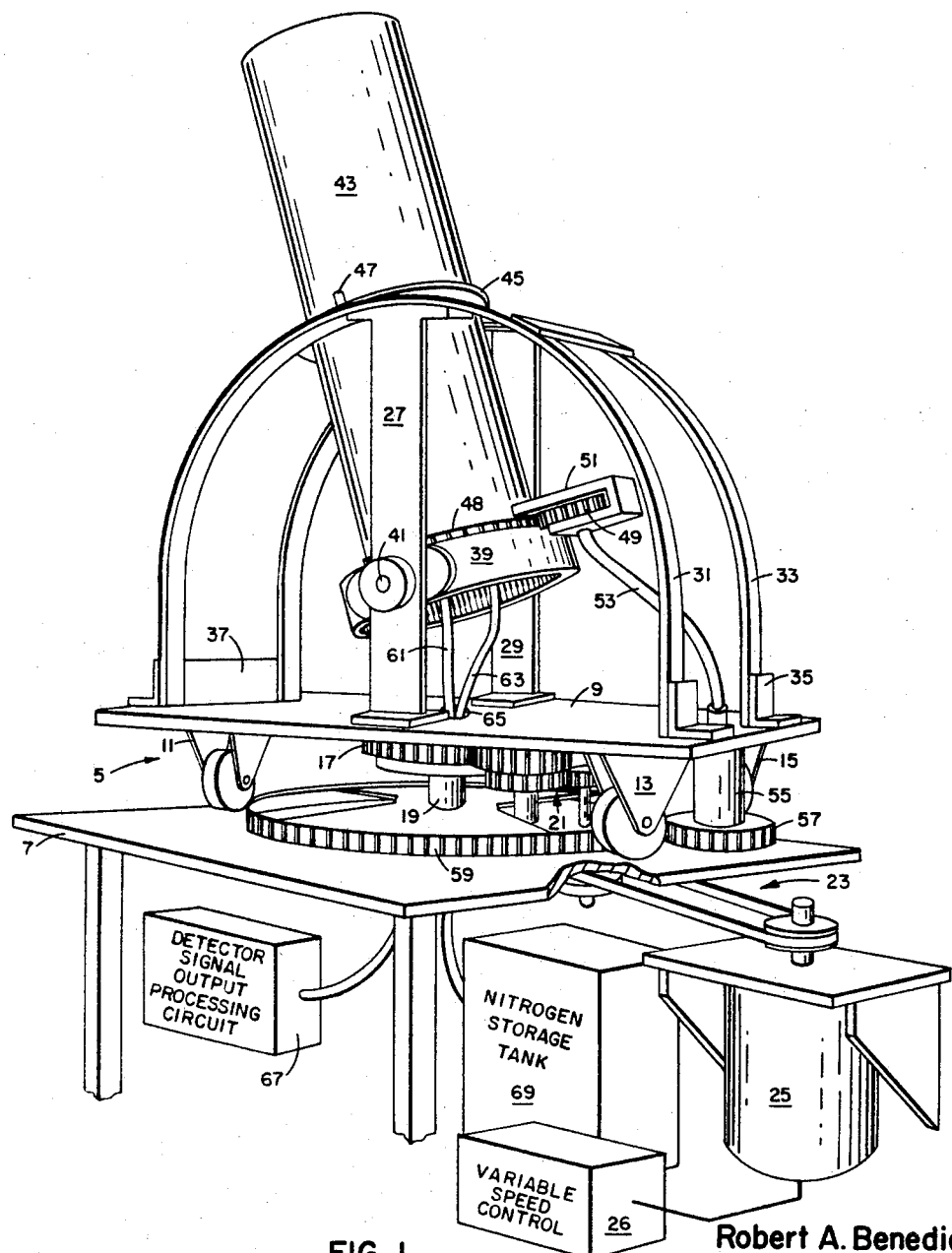
FIGURE 1 is a perspective view, partially in section, of an infrared scanner according to the present invention.

Referring now to FIGURE 1, an infrared scanner generally indicated by reference numeral 5 is shown and consists of a fixed base 7 upon which a rotating table 9 is supported on three roller assemblies 11, 13 and 15. Table 9 is held in position and rotated by means of a gear 17 which is affixed to table 9 at the center of the table and made to rotate about a pintle 19 which is affixed to and extends upwardly from base 7 into rotatable engagement with gear 17. Gear 17 is driven by a gear train 21 which meshes with gear 17 at one end while the other end is connected by means of a belt drive assembly 23 to a motor 25 having a variable speed control circuit 26 connected to the input.

Figure 2:
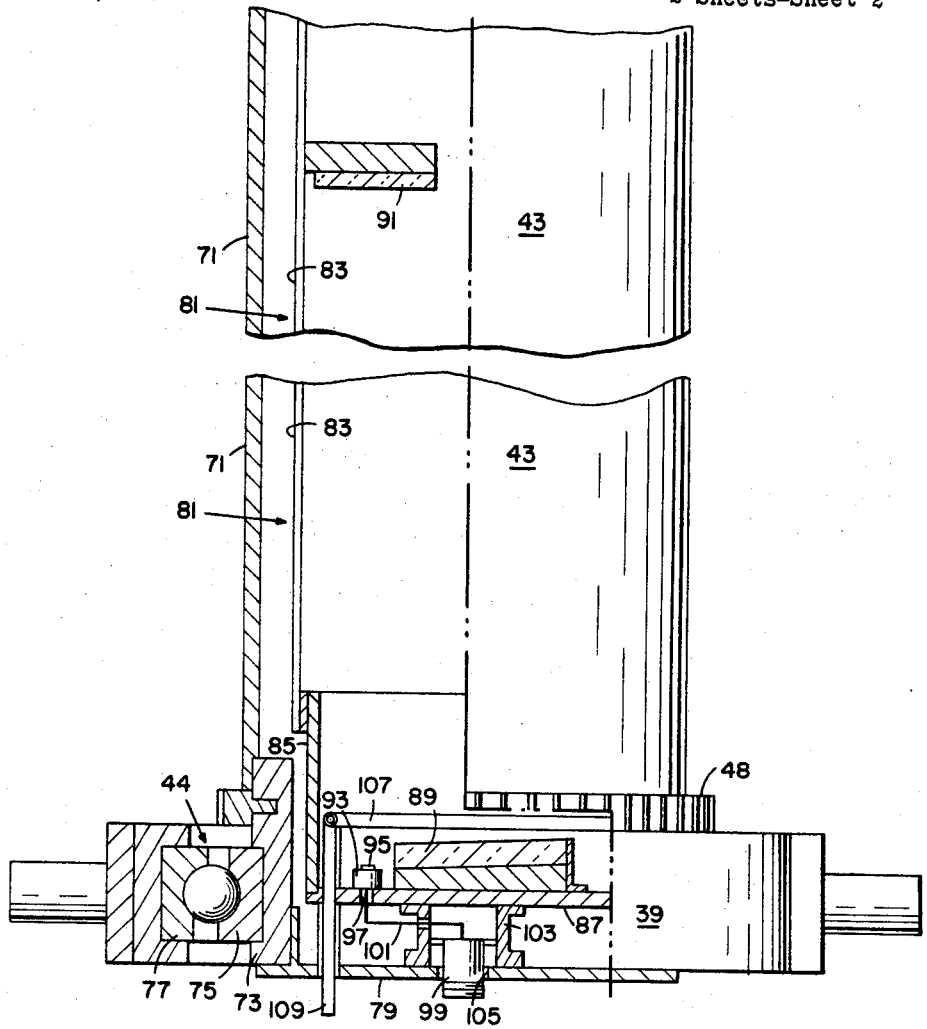
FIGURE 2 is a diagrammatic view partially in section, of a scanner tube and optics system as used in FIGURE 1.

Table 9 has a pair of parallel support columns 27 and 29 which supports a semi-circular track which consists of two semi-circular metal strips 31 and 33 which are attached to table 9 at each end by means of brackets 35 and 37 and to columns 27 and 29 respectively at the uppermost point of the tracks. A scanner tube yoke assembly 39 is pivotally mounted between support columns 27 and 29 as shown at 41. Yoke 39 is adapted for receiving a scanner tube 43 which is rotatably mounted in yoke 39 by means of a large ball bearing 44 (FIGURE 2) disposed in yoke 39 at the base of tube 43 while the upper portion of tube 43 is supported by a bearing collar 45 around tube 43 which allows tube 43 to rotate and is disposed for sliding movement along tracks 31 and 33 so that the angle of view of scanner tube 43 may be adjusted with respect to the plane of table 9 and is held at a given angle by means of set screws 47. Rotation of tube 43 is provided by means of a peripheral gear 48 located at the base of scanner tube 43 which is meshed with a scanner tube drive gear 49. Gear 49 is held in place by a support member 51 affixed to yoke 39 and rotated by means of a flexible shaft 53 which is connected through a bearing assembly 55 to a planet gear 57 located beneath table 9. Gear 57 is in mesh with a sun gear 59 which is located symmetrically with respect to pintle 19 and affixed to base 7 so that when table 9 is rotated scanner tube 43 is rotated at the same rate in an opposite direction to prevent twisting of a cable 61 providing electrical connection to scanner tube 43 and a tube 63 providing a nitrogen gas connection to tube 43 thus providing direct connections from tube 43 to external connections through an aperture 65 extending down through pintle 19 and base 7 without the use of slip rings or a brush-and-commutator combination to connect across the rotating interface to fixed external connections. Cable 65 is connected to a detector signal output processing circuit 67 and tube 63 is connected to a nitrogen storage tank 69.

Referring now to the structure of scanner tube 43 (FIGURE 2), a cylindrical outer housing 71 is provided which has a sleeve 73 affixed to the base thereof in which the peripheral gear 48 is affixed. Sleeve 73 is further affixed to an inner bearing surface 75 of bearing 44 while an outer bearing surface 77 is affixed to scanner tube yoke 39 whereby scanner tube 43 is rotatably mounted in yoke 39 and a cap 79 is affixed in the lower end of sleeve 73 for supporting the inner optics structure of scanner tube 43.

The inner optics structure of tube 43 consists of an optics system comprising an optics tube 81, a cylindrical housing 83 with a sleeve 85 affixed to the bottom portion and inclosed at the bottom end by a circular plate 87 upon the inner side of which is mounted a spherical primary mirror 89 approximately in the center of plate 87 wherefrom incident radiation is reflected toward a secondary mirror 91 mounted on the side at the upper end of housing 83 over an infrared detector 93 such as the Ektron Type N-1, lead sulfide detector, made by Eastman Kodak, so that radiation is reflected, onto detector 93 from primary mirror 89. Detector 93 is mounted on plate 87 together with primary mirror 89 in order to minimize the necessity to realign the optics if these parts require removal from the system. A narrow bandpass filter 95, Type NB–SO6–2; made by Infrared Industries Incorporated is placed over the detector which limits the radiation reaching the detector to a narrow band of wavelengths. The output of detector 93 extends through aperture 97 in plate 87 and is connected to an electrical connector 99 by means of cable 101. Connector 99 is secured to a support member 103 which is affixed to plate 87 and supports the optics system when inserted into scanner tube 43 and is connected to plate 79 so that connector 99 extends through aperture 105 in cap 79 for connection to cable 61 (FIGURE 1). The optics system further comprises a circular perforated copper tube 107 installed to encircle the detector 93 and primary mirror 89 so as to direct dry nitrogen gas onto them to cool the optics system without allowing moisture to condense on the cold surface of mirror 89 which if it were allowed to exist would render the system totally inoperative. Tube 107 is connected to tube 109 and extends downward through plate 87 and cap 79 respectively for connection to tube 63 (FIGURE 1).

Figure 3:
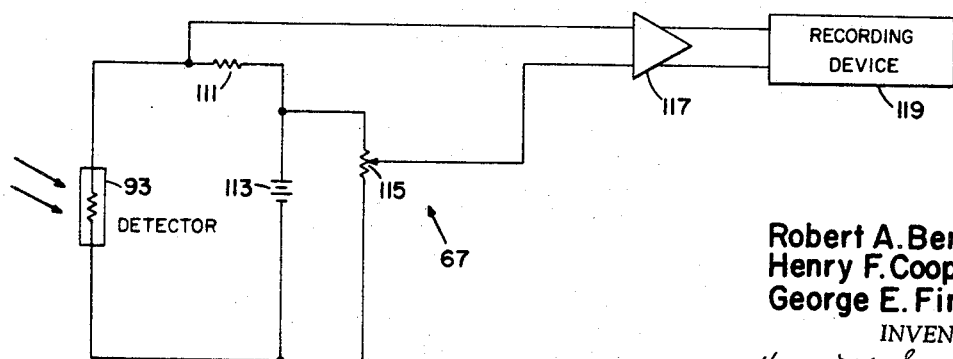
FIGURE 3 is a schematic diagram of the detector signal output processing circuit shown in block form in FIGURE 1.

The electrical signal is transmitted from the scanner tube 43 by means of lead 61 to the detector signal output processing circuit 67 (FIGURE 3) which employs the photoconductive infrared detector 93 connected thereto as the variable resistance leg of a D-C bridge circuit. The detector 93 is connected in series with a load resistor 111 which is connected in parallel with a D-C bias 113 and a variable balancing potentiometer 115. The output is taken between the wiper of potentiometer 115 and the junction of detector 93 and load resistor 111 and connected to the input of an amplifier 117 whose output is connected to a recording device 119 for recording the detector output as the scanner is made to scan an annulus of the hemisphere.

*In operation*

The optics system housed in the optics tube 81 is aligned by adjusting the secondary mirror 91 at the upper portion of the cylindrical housing 83 until the radiation reflected from the primary mirror 89 is reflected onto the detector 93. The optics tube is then inserted into the scanner tube 43 and affixed by means of support member 103 to plate 79. Electrical connection is made by connecting cable 61 to connector 99 and the nitrogen gas supply tube 63 is connected to tube 109.

Upon completion of these preliminary connections the zenith angle is set which is the angle between the zenith and the desired field of view of the scanner tube 43. In the present device this adjustment is made manually at any inclination between the zenith and the horizon. It is conceivable that this adjustment could be made mechanically from a remote selector or in many other conventional position manners.

Once the zenith angle is set, the rotating table 9 is rotated at a predetermined rate of rotation adjustable by the variable speed control 26 connected to motor 25. The speed of rotation of the table 9 is of considerable importance since by matching the rotation rate to the time constant of the detector 93 it is possible to successively examine small fields of view along the scanned annulus, whereas by increasing the rotation rate, longer lengths are scanned on the annulus during the same time period. The effect in the first case, is to record field intensities virtually point by point, while in the second case these intensities are "smoothed out" to provide an integrated output for the recording device 119.

At the same time that table 9 is rotating scanner tube 43 is made to rotate in an opposite direction at the same rate by means of a flexible shaft arrangement as discussed above so that direct electrical connection is made to the scanner tube without twisting the cable; that is, there is no relative motion between the scanner tube 43 and the fixed base 7. The advantage of the direct connection is that there is a much stronger signal from the output of detector 93 to the processing circuit than there would be if slip rings were used or other commutating devices due to the losses involved.

Experiment verified theory that the optimum detector signal was obtained when the load resistor 111 (FIGURE 3) was made equal to the detector dark resistance, that is, with no radiation incident upon it. The detector dark resistance at room temperature (25° C.) is 360,000 ohms, while at liquid nitrogen temperature (−196° C.) the dark resistance increases to more than 200 megohms. Since low temperature operation of the scanner is anticipated, load resistor 111 may be 360K ohms upward to 220 megohms depending upon the operating temperature of the detector. The detector is cooled by dry nitrogen gas escaping from the perforated tube 107 which is disposed adjacent to and above the detector 93 and mirror 89 and experiment has verified that a gas flow pressure from 15 p.s.i. to 20 p.s.i. in tube 107 is adequate to prevent icing of the optics system.

In the present device the primary mirror 89 is a spherical mirror of 30 inches focal length which along with the detector size determines the field angle $\Omega$ of the system. For the dimensions given, $$\Omega = \frac{20 \times 10^{-3} \text{ in.}}{30 \text{ in.}}$$

$$= \tfrac{2}{3} \text{ milliradians}$$

$$\approx 140 \text{ seconds of arc}$$

This field angle represents the angular diameter of the field of view seen by the detector, and, hence, the width of the annulus scanned in each rotation.

The system has been calibrated with the detector 93 operating at both room temperature and liquid nitrogen temperature. A Barnes Engineering high temperature controller was placed in the focal plane of a Barnes off-axis collimator. Throughout the calibration procedure, the entrance pupil of the collimator was set at 0.333 square centimeter in area.

For the room temperature calibration the scanner tube 43 was set in a zenith position looking directly into the collimator suspended above it. For the liquid nitrogen temperature calibration, the scanner tube was left in the vertical position to allow the liquid nitrogen to thoroughly cool the optics and detector. After nulling the amplifier 117, a cold plate blocking the scanner aperture was removed and the collimated radiation permitted to enter from above. A John Fluke differential voltmeter was used to measure the output voltage, but all of its nulling controls were kept set to zero with nulling being accomplished with potentiometer 115 of the detector bridge circuit.

While the invention has been described with reference to a preferred embodiment thereof, it will be apparent that various modifications and other embodiments thereof will occur to those skilled in the art in light of the instant disclosure. Accordingly, it is desired that the scope of this invention be limited only by the appended claims.

What is claimed is:

1. An atmospheric infrared radiation scanner comprising: a fixed base; a rotatable table disposed for rotation about a fixed axis perpendicular to said fixed base; a scanner tube having a yoke pivotally supported about an axis perpendicular to said first mentioned axis, said scanner tube having a cylindrical housing extending upwardly from said scanner tube yoke and disposed for rotation about its longitudinal axis with respect to said scanner tube yoke; a semicircular track having each end affixed to said rotatable table; bearing collar disposed around said scanner tube at the upper portion thereof and positionable along said semicircular track whereby the inclination of said scanner tube may be varied between the zenith and the horizon of a hemisphere which it is scanning; a pair of support columns affixed to said rotatable table and extending upward therefrom parallel to said axis perpendicular to said fixed base for supporting said semicircular track and said scanner tube yoke; said scanner tube having an infrared detector disposed therein for detecting infrared radiation from said hemisphere; a detector signal output processing circuit connected to an output of said detector; a first rotating means for imparting rotation to said rotatable table; and a second rotating means for rotating said scanner tube in an opposite direction at the same rate of rotation as said rotating table whereby there is no relative rotation of said scanner tube with respect to said fixed base allowing direct electrical connection between said detector and said signal processing circuit as said scanner rotates scanning an annulus of said hemisphere.

2. An atmospheric infrared radiation scanner as set forth in claim 1 wherein said scanner tube further comprises an optics tube, a circular plate inserted into said cylindrical housing and affixed to the lower portion of said optics tube, a primary mirror mounted in the bottom of said optics tube on said circular plate for reflecting incident radiation therefrom, and a secondary mirror mounted in the upper portion of said optics tube and aligned with said primary mirror whereby incident radiation reflected from said primary mirror is reflected onto said detector which is mounted on said circular plate along with said primary mirror.

3. An atmospheric infrared radiation scanner as set forth in claim 2 wherein said optics tube further comprises a circular tube adjacent to and above said detector and primary mirror, an external source of compressed gas connected to said circular tube, and said circular tube having a plurality of perforations around the inner diameter thereof whereby said compressed gas is blown over said detector and primary mirror to cool said detector and mirror.

4. An atmospheric infrared radiation scanner as set forth in claim 3 wherein said gas is compressed nitrogen.

5. An atmospheric infrared radiation scanner as set forth in claim 1 wherein first rotating means for rotating said table comprises a variable speed motor, a variable speed control connected to said motor, a belt drive assembly connected to an output shaft of said motor, a gear train having one end connected to said belt drive assembly, a gear affixed to said rotating table and rotatable about said axis perpendicular to said fixed base being meshed with the other end of said gear train, and a central pintle about which said table rotates affixed to said fixed base and extending upward therefrom into rotatable engagement with said gear affixed to said table.

6. An atmospheric infrared radiation scanner as set forth in claim 5 wherein said second rotating means comprises a sun gear affixed to said base centrally about said pintle, a planet gear meshed with said sun gear and rotatably mounted beneath said table by means of a shaft which extends upward through said table, a flexible shaft having one end connected to said shaft of said planet gear, a drive gear connected to the other end of said flexible shaft, said drive gear being rotatably mounted by means of a support member affixed to said scanner tube yoke, and a peripheral gear affixed to said scanner tube cylindrical housing and in mesh with said drive gear whereby when said table is rotated in one direction said scanner tube is rotated in the opposite direction at the same rate thereby preventing relative rotation between said scanner tube and said fixed base.

7. An atmospheric infrared radiation scanner as set forth in claim 1 wherein said signal output processing circuit comprises an electrical bridge network, an amplifier having an input connected to an output of said bridge network, and a recording means connected to an output of said amplifier for recording radiation intensities detected by said detector as it scans a predetermined annulus of said hemisphere.

No references cited.

RALPH G. WILSON, *Primary Examiner.*

A. B. CROFT, *Assistant Examiner.*